United States Patent [19]

Gerber

[11] Patent Number: 4,458,629

[45] Date of Patent: Jul. 10, 1984

[54] LITTER FOR MAMMALS AND FOWL

[76] Inventor: Milton L. Gerber, 625 Hickory La., Ossian, Ind. 46777

[21] Appl. No.: 341,283

[22] Filed: Jan. 21, 1982

Related U.S. Application Data

[63] Continuation-in-part of Ser. No. 178,391, Aug. 15, 1980.

[51] Int. Cl.$^3$ ............................................. A01K 1/015
[52] U.S. Cl. ...................................................... 119/1
[58] Field of Search ............................................ 119/1

[56] References Cited

U.S. PATENT DOCUMENTS

| | | | |
|---|---|---|---|
| 2,597,457 | 5/1952 | Cook | 119/1 |
| 2,708,418 | 5/1955 | Sugarman et al. | 119/1 |
| 4,263,873 | 4/1981 | Christianson | 119/1 |
| 4,341,180 | 7/1982 | Cortigene et al. | 119/1 |

Primary Examiner—Hugh R. Chamblee
Attorney, Agent, or Firm—George A. Gust

[57] ABSTRACT

An improved pelletized mammal or fowl litter, particularly useful for domestic pets and laboratory animals, is described. The litter provides a highly absorbent, antibacterial, antifungal and effective odor control bedding which is composed of defibered cellulosic materials mixed with chemicals, obtaining the properties described herein. The composition which is chemically of a basic pH is compressed into pellet form to provide improved handling and antitracking qualities.

17 Claims, 1 Drawing Figure

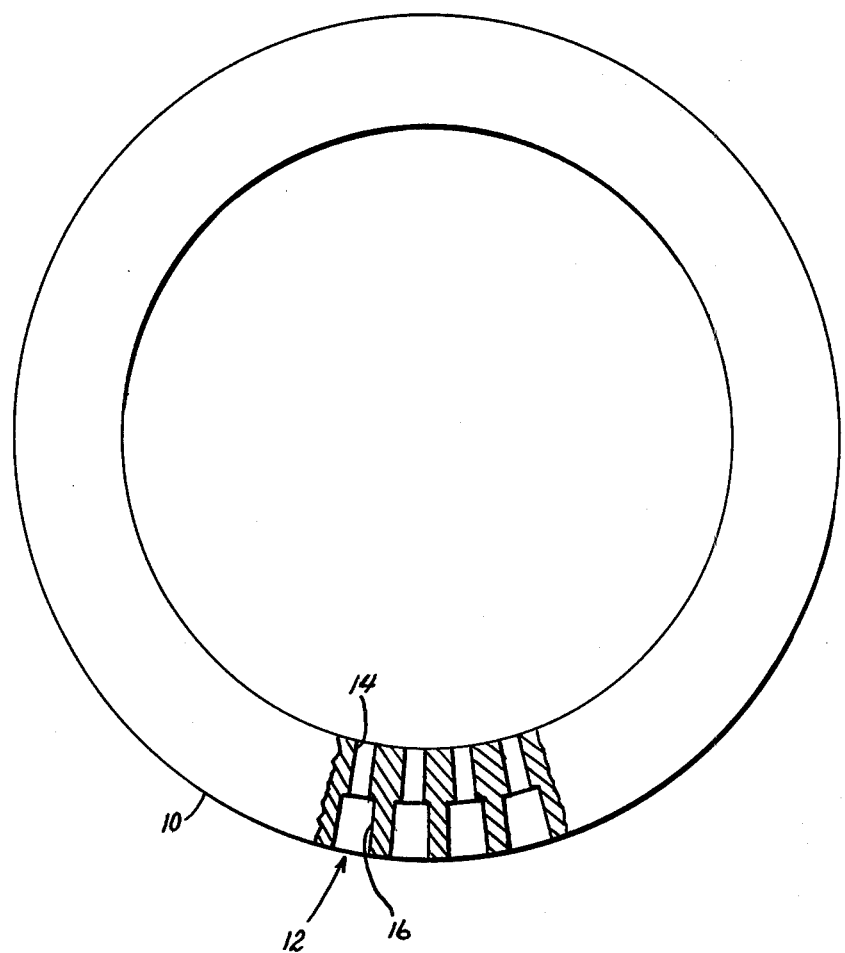

LITTER FOR MAMMALS AND FOWL

BACKGROUND OF THE INVENTION

Field of the Invention

This is a continuation-in-part application of application Ser. No. 178,391, filed Aug. 15, 1980.

The present invention relates to a pelletized mammal and bird litter composition of basic pH produced from defibered cellulosic materials, calcined alkaline earth metal oxides, and antifungal and antibacterial chemicals.

Description of the Prior Art

There are a number of materials or compositions used as animal litter—the paramount materials being clays, bentonites, cellulose, and other earth materials. Odor controlling or odor camouflaging agents are added to some of these materials. Most of these products are limited in liquid absorption capacities to approximatley equal their own weight. The resultant wetted materials cling to litter trays and pans, creating disposal problems. Due to the limited liquid absorption and odor control properties, these materials when used as feline litter must be discarded after three to four days' use. Many clay and other organic litter materials have bulk densities ranging from 32 to 45 lbs/ft$^3$, creating heavy handling problems for consumers and low absorbency. Domestic pets tend to track inorganic abrasive materials, causing damage to flooring and creating housekeeping problems.

Litter produced from alfalfa or related forage crops are described in U.S. Pat. No. 3,941,090 to Fry and U.S. Pat. No. 3,286,691 to McFadden. Pelletized forage materials tend to disintegrate in the presence of liquid animal waste creating difficult disposal problems along with the objectionable forage odor emanating from the product.

The use of flyash which may, not be necessarily, contain CaO and MgO, in combination with small quantities of cellulosic fiber to provide a particulate flow channel is described in U.S. Pat. No. 4,157,696 to Carlberg. There are inherent limitations to the use of flyash in that the critical and required chemical constituents vary greatly depending on the type of fuel burned, the combustion process, and the nature and effectiveness of gas cleaning equipment being employed. Some flyash is completely devoid of the required elements, in particular CaO and MgO.

The use of cellulosic paper pulp mill shavings with the addition of chlorophyll compounds is described in U.S. Pat. No. 3,828,731 to White and Arthur.

Christianson U.S. Pat. No. 4,263,873 specifies that the important component of the disclosed animal litter is the acid salt which neutralizes the urine and buffers the litter, preventing the formation and release of ammonia odors. It is specified that the preferred salt is an acidic sodium sulphate, the preferred pH being 4 to 4.5 with 1 to 5.5 being acceptable. The acid salt is described as being a buffering agent and is expected to neutralize an acidic urine. The pellets are described as typically having a density of 1 cubic centimeter per gram (which equates to 62.4 lbs/ft$^3$) or an equivalent range of 46.8 to 68.6 pounds per cubic foot, which approaches densities of solid wood.

Kuceski, U.S. Pat. No. 3,059,616 discloses the litter as an acidic cellulosic material. It is taught that it is old to acidify cellulosic materials. The patentee objects to especially low pH ranges or those having limited neutralization capacity of the basic by-products of urines such as ammonia. It is specified that the effective pH is 6.5. The use of strong acids, such as sulphuric, phosphoric, or hydrochloric is mentioned along with buffering these acids with a common base chemical to attain a somewhat higher pH. The resulting product, however, is acidic.

Sugarman U.S. Pat. No. 2,708,418 describes the paper pulp to be made under conditions whereby it contains a slight excess of some acid, such as phosphoric, to neutralize and combine with the ammonia formed by aminal wastes.

The prior art consistently teaches that an effective animal litter is dependent on the use of an acidic medium intended to buffer or neutralize, absorb or bind the ammonia and other gas by-products produced by animal waste. Essentially, the theory is based on binding the ammonia generated from the urea during the waste decomposition process forming other complexes such as ammonium sulphate and aluminum hydroxide. This chemical reaction is valid when the components are in a liquid gas phase. With litter, there exists a solid gas phase, and insufficient chemical reaction can take place to control the ammonia. This is especially true in litters in which waste materials stay wet for extended periods of time. Testing has confirmed that this method of odor control is not effective, which may explain the low volume or near non-existence of these types of products in the marketplace.

Other prior art may be found in U.S. Pat. Nos. 2,708,418; 3,029,783; 3,059,615; 3,765,371; 3,921,581; 3,980,050; 4,085,704; 4,159,008 and 4,203,388.

SUMMARY OF THE INVENTION

The present invention provides a litter of basic pH for mammals and birds that utilizes relatively inexpensive raw materials, such as recycled celllulosic fiber, combined with odor-, fungi-, and bacteria- controlling chemicals. This composition is compressed into pellet form that is lightweight and has the ability to absorb liquids equal to 172% of the product's weight. It has further advantages in that it empties dry from litter pans and trays and effectively controls odors for relatively long periods of time. Other uses for the composition, but not limited to, are soil conditioners, oil and chemical spill absorbent, and a deodorizing material for use in household refrigerators.

The present invention involves the use of virgin or recycled cellulosic materials that are defibered and produced from, but not limited to, newsprint, magazines, corrugated medium, ground wood paper stock, wood residues, etc. To these fibers or the combination of these fibers, calcined alkaline earth metal oxides, aluminum sulfate, N-alkyl-pyridinium propionates, and water to facilitate the pelletizing process, are added resulting in basic pH levels of 7.1 and higher.

More specifically, the litter of this invention includes a cellulosic product which includes an adherent mass of cellulosic fibers, calcium oxide and water, in which such fibers constitute the dominant content by weight of the product, and the pH is basic. The fibers may form up to 99% by weight of the mass and the bulk density something in the order of 18 lbs/ft$^3$ or less.

The process for the production of the litter of this invention includes the formation of pellets of the cellulosic composition which comprises admixing cellulosic fibers and calcined alkaline earth metal oxides, moisturizing the resultant admixture, and pelletizing the moistened admixture, the cellulosic fibers being dominant in the admixture, and controlling the pH to a level greater than 7. More specifically, one such process includes the steps of producing a pelletized litter including the steps of forming a cellulosic fibrous mass, mixing with such mass 200 mesh calcium and magnesium oxides in a weight ratio of about 95% to 97% fibers, about 1% to 1.74% calcium oxide, about 0.5% to 1.26% magnesium oxide, moisturizing the mixture to a content by weight of about 30% to 40% water, and pelletizing the moisturized mixture to a bulk density of about 18 lbs/ft$^3$ or less.

It is an object of this invention to provide cellulosic litter composition, having a basic pH, with high moisture absorbency, and odor controlling properties.

It is further the object of this invention to provide a litter of basic pH composition that is lightweight and with pellet properties that do not disintegrate when subjected to animal liquid wastes.

An additional object of this invention is to provide an animal litter that is non-abrasive, not dusty, and resists tracking.

It is an additional object of this invention to provide a process for the production of the described composition.

The above-mentioned and other features and objects of this invention and the manner of attaining them will become more apparent and the invention itself will be best understood by reference to the following description of an embodiment of the invention taken in conjunction with the accompanying drawing.

BRIEF DESCRIPTION OF THE DRAWING

The drawing is a front view of an extruding ring used in the pelletizing machine for producing pellets.

DETAILED DESCRIPTION OF THE INVENTION

This invention provides a cellulosic fiber-based pellet produced by admixing with cellulosic fibers calcined alkaline earth metal oxides, and, for example, aluminum sulphate ($Al_2(SO_4)_3.18H_2O$). The calcined alkaline earth metal oxides, in particular calcium oxide (CaO) and magnesium oxide (MgO), provide an excellent binder and disinfectant. The aluminum sulphate enhances the antibacterial and antifungal properties and acts as a buffering agent when strong base chemicals are used. The composition results in a product that imparts a clean, sweet scent substantially devoid of odors emanating from the base materials.

The basic formulation includes cellulosic fibers and one or more chemicals mixed with water with the fibrous content ranging up to 99% by weight of the total mass. More specific variations are as follows:
cellulosic fibers and CaO;
cellulosic fibers, CaO and MgO;
cellulosic fibers and calcined alkaline earth metal oxides; $Al_2(SO_4)_3$ admixed with any of the above; and one of the N-alkyl pyridinium propionates such as N-hexadecyl pyridinum propionate.

The CaO contributes to the control of odor, fungus and bacteria. It also serves to an extent as a binder. MgO contributes as a binder. As previously mentioned, aluminum sulphate enhances the antibacterial and antifungal properties. The propionates serve the purpose mentioned. The proportions of chemicals used should result in a basic pH in the final product.

More specifically, the cellulosic fibers such as newsprint, magazines, and mixed papers of various kinds are prepared by defibering the raw material by liquid hydropulping or by mechanical equipment such as hammermills designed for this purpose. A preferred screen analysis of the defibered material would be as follows:

| Percent | through Tyler Sieve No. |
|---------|------------------------|
| 100     | 4                      |
| 80      | 8                      |
| 60      | 12                     |
| 50      | 24                     |
| 30      | 48                     |
| 10      | 100                    |

The resultant fiber mass is then combined with finely ground or pulverized chemicals of which 100% will pass through a 200 mesh screen. Chemical contents ranging from 1% to 5% of the calcined alkaline earth metal oxides and, if desired, from 1% to 3% of aluminum sulphate are added on a percent of weight basis. A preferred composition consists of 95% fiber, 1.75% CaO, 1.26% MgO, and 2% $Al_2(SO_4)_3.18H_2O$: as a buffering agent 0.1% to 1% N-alkyl pyridinium propionate may be added when used for domestic pets and in particular the feline species and fowl, in which event the fiber content is reduced to 94%. Another useful formula utilizes 97% fiber, 1% to 1.75% CaO and 0.5% to 1.26% MgO. Liquid chemicals providing equivalent properties may also be used separately or in combination with dry chemicals described. Tests have indicated that the resultant pH should be basic.

Typical sources of commercially available calcined alkaline earth metal oxides have a composition as follows:

| Calcium oxide    | CaO       | 57.66%  |
| Magnesium oxide  | MgO       | 41.51%  |
| Silicon dioxide  | $SiO_2$   | 0.19%   |
| Aluminum oxide   | $Al_2O_3$ | 0.20%   |
| Iron oxide       | $Fe_2O_3$ | 0.085%  |
| Sulfur           | S         | 0.03%   |
| Loss of ignition |           | 0.35%   |

The fiber and chemical admixture is then subjected to a source of moisture such as steam or water mist until a $H_2O$ content of 30% to 40% by weight is attained. The final moisture content will affect pellet density, appearance and production rates. A dried pellet density of 12 to 18 lbs/ft$^3$ is preferred. A pellet mill capable of, but not limited to, providing an extruded pellet of 3/16" diameter and ¼–½" in length has been found suitable.

The extruded pellets are then dried to a final moisture content of 12% to 16%. It is preferred that small particles and fines from the product be screened or air separated prior to packaging.

Suitable dyes may be used to achieve any preferred color to enhance consumer appeal when desired.

The pellet mill used in producing the product of this invention is conventional and is an actual working arrangement in a Sprout Waldron 500 L Pellet machine. The material processed by the machine is extruded through a multiplicity of radial die openings spaced about the circumference of a die ring 10 in the end of the extruder barrel, a preferred design of such die openings being indicated by the numeral 12 in the drawing. The ring 10 has a radial thickness of 1.050" which constitutes the length of each opening 12. Each opening is generally cylindrical and of stepped diameter, the smaller portion 14 having a diameter of 3/16" and a length of ½", and the larger portion 16 having a diameter of 7/32". Spacing between openings 12 measured on the inner circumference of ring 10 is 0.100". The length of the smaller portion 14 is short enough so as not to impede the extrusion process and otherwise cause plugging.

It has been found that this configuration for the die openings 12 is particularly advantageous in minimizing or avoiding the problem of plugging due to excessive friction during production runs. For other die opening designs, the material was found to plug the openings to such an extent that the compacted plugs had to be drilled out.

To obtain the desired pellet length, a knife on the end of the extruder barrel rotates concentrically about the exterior of ring 10 in a conventional manner to cut off the extrusions into relatively short lengths.

The following examples are provided as an illustration of typical embodiments of the process of this invention and the products thereof and are not intended in any way to limit the scope of the invention to the specific constraints therein described.

EXAMPLE 1

Newsprint was defibered in a Grundler 24-40 fiber mill using 11/64" screen openings. A fiberous mass was produced having a bulk density of 1.7 lbs/ft$^3$. This mass was thoroughly mixed, to provide homogeneous mass, with finely ground CaO and MgO in a weight ratio of 97 parts fiber to 1.8 parts CaO and 1.3 MgO. Water mist was then added to adjust the moisture content by weight to 40%. The wetted fiber chemical mix was then pelletized or extruded in a Sprout Waldron 500 L Pellet machine. The pellets were dried in a conveyor type oven to a final moisture content of 12–14%.

The products physical properties were as follows:
Bulk density—14 lbs/ft$^3$
Moisture content—13%
Moisture absorption capacity by weight—205%
Pellet diameter—3/16"
Average pellet length—⅜"
Antibacterial capacity—resulted in 43% reduction of bacteria tested in 48 hours at 37° C.
pH of 9.1.

EXAMPLE 2

Composition was prepared the same as Example 1 except the fiber source was magazines and mixed paper. Bulk density of this composition increased to 18 lbs/ft$^3$.

EXAMPLE 3

Fifty microliters of 0.1 molar solution N-hexadecyl-pyridinium propionate (J. A. Gautier, E. Lerio and J. Renault, Bull. soc. chim. France, 1955, 1202-4) was spotted on filter paper discs which were then placed into Petri dishes containing Sabo-Dex Agar medium.

The above prepared propionate salt discs were tested against the microorganisms listed in Table I. The antimicrobial effect of N-hexadecyl-pyridinium propionate was checked against placebo (water) and propionic acid.

It was also found that 50 microliters of 0.1 milar aluminum-sulphate solution alone or combined with N-hexadecyl pyridinium propionate enhanced the bactericidal and fungicidal activities.

TABLE I

| Microorganism: | 1* | 2 | 1 + 2 | 3 | 4 | |
|---|---|---|---|---|---|---|
| Streptococcus foecalis | +++ | +++ | +++ | − | − | (a) |
| Eschericia coli | +++ | +++ | +++ | − | − | (a) |
| Saccharomyces cerevisae | ++ | +++ | +++ | − | − | (a) |
| Geotrichum candidum | + | +++ | +++ | − | − | (a) |
| Aspergillus niger | +++ | − | +++ | − | − | (a) |
| Penicillum notatum | + | +++ | +++ | − | − | (a) |
| Aspergillus flavus | +++ | − | +++ | − | − | (b) |
| Penicillum citrinum | +++ | − | +++ | − | − | (b) |
| Aspergillus ochraceous | ++ | +++ | +++ | − | − | (b) |
| Candida albicous | +++ | +++ | +++ | − | − | (b) |

*1: N—hexadecyl-pyridinium propionate (50 microliters/0.1 molar solution); 2: [Al$_2$(SO$_4$)$_3$.18 H$_2$O] (50 microliters/0.1 molar solution); 3: propionic acid; 4: water. (a) Inhibition assessed after 30 days; (b) Inhibition evaluated after 12 days. Inhibition is marked by +++ (strong), ++ (medium), + (weak); or − (no inhibition).

EXAMPLE 4

N-hexadecyl pyridinium propionate (0.01 to 1.0 parts), aluminum sulphate (1.0 to 3.0 parts), CaO or CaO.MgO; 1.0 to 5.0 parts were mixed, moisturized and pelletized with 95 parts cellulosic fiber as described in connection with Example 1. The pH was approximately 8.5. One pair of white mice, strain CD-1 (from Charles River Breeding Laboratories, Wilmington, Mass.) were placed in an autoclaved (20 min/121° C./15 lbs psi) cage containing 100 grams of the above litter. After seven days the bedding was removed. The predominant bacteria of the mouse fecal material was isolated and grown in pure cellulosic fiber so exactly the same number of bacteria could be added to each type of bedding sample. A standard curve was calculated so the correct concentration of the overnight broth culture of the bacterium mouse feces could be obtained by reading the optical density of the culture in a spectrophotometer.

Five grams of fresh bedding in 494 ml of sterile saline was mixed for five minutes in a Waring blender. The 1.4 × 10$^7$ bacteria in one ml of nutrient broth was added and blended for one minute. One-tenth ml of the blended bedding and bacteria was plated on an EMB agar and incubated at 37° C. for 48 hours. The treated bedding caused a reduction of the number of viable bacteria in comparison with the control bedding which was composed of pure, untreated cellulosic fiber. The animal bedding decreased the number of bacteria from 14,200,000 to 803,000 which corresponds to a 87½% decrease of bacteria when compared to the control bedding. The composition of this example thus exhibited a good antibacterial activity against mouse fecal bacteria.

While specific examples of various embodiments have been given, the consituency may vary somewhat depending upon the particular results desired; i.e. degrees of absorbency, antibacterial, antifungel and odor control.

An objective is to maximize absorbency yet achieve the necessary degree of binding, antitracking, antibacterial, antifungal and odor controlling properties in the product. Since the cellulosic fibers constitute the primary absorbative constituent, the content thereof should not be too low and preferably not less than 90% by weight of the finished product. In decreasing this percentage, a point is reached at which the chemical content becomes sufficiently high as to reach the point of diminishing returns; i.e. the additional amounts of chemical do not yield more than a negligible gain in contributing the antibacterial, antifungal and odor controlling properties. Hence a point maay be reached for obtaining a balance in all of the properties desired. Using appreciably less than 90% fibers, such as 50%, thus is considered too low.

As explained previously, the prior art has consistently taught that the pH of litter compositions should be acidic, the theory apparently being based upob the waste decomposing and, during decomposition, generating ammonia and other gases which are buffered or neutralized by the acidic litter. Tests have indicated that acidic litters do not yield the results accomplished by means of the present invention wherein the acidic property of the litter is avoided. It has been discovered that litters in this invention which are basic in composition (pH of 8 to 9, for example) are superior in controlling and absorbing odors emanating from the animal waste. Tests indicate that this litter composition produced as described herein, when an acidic urine is deposited on a sufficiently alkaline litter, the urine is neutralized and the enzymatic degradation of the urea is inhibited, reducing the formation of ammonia. This chemical reaction, coupled with a fast drying litter that has a high odor and liquid absorption capacity, will effectively dry the waste before objectionable odor-causing gases are formed. Further, the chemical additives described herein are effective disinfectants and bactericides, resulting in a litter that is effective in controlling odors from liquid or solid animal waste.

When the litter described herein is tested under ASTM C-739 odor absorption test, the basic pH composition which utilized the chemicals described herein were much more effective than acidic materials tested under the same conditions. It is theorized that this salutary result is attributable to the prevention of ammonia from forming in the first instance as contrasted with attempting to neutralize ammonia after it has been formed as suggested in the prior art. One test for the purpose of determining the odor control effectiveness of acidic or basic litters was conducted as follows, identical base materials, namely the cellulose, being the same but the chemical additives only being changed.

In the table which follows, the litter "A" was prepared using cellulosic paper fiber pellets containing 3% by weight of aluminum sulfate having a pH of 4.6. Litter "C" was prepared using cellulosic paper fiber pellets containing 3% by weight of calcium oxide and having a pH of 9.0. Litter "B" was prepared using cellulosic paper fiber pellets only with no chemical additives.

Two hundred milliliters of each of the litters, "A" and 37 C" were placed in 250 milliliter Erlenmeyer flasks to which 15 milliliters of animal urine were added. Fifteen milliliters of distilled water were added to control litter "B". The litters were tested every 24 hours for odor and ammonia generation for a period of four days. Three independent observers conducting four different observations determined the odor levels of the three litters, the neutral litter "B" being assigned an arbitrary value of 5. Odors which were more pleasant were rated 0 to 5; odors less pleasant 5 to 10. The average result were as follows:

| Sample | Observations | | | |
|---|---|---|---|---|
| | 1 | 2 | 3 | 4 |
| A | 3 | 3 | 7 | 7 |
| B | 5 | 5 | 5 | 5 |
| C | 3 | 6 | 5 | 5 |

An attempt was made to determine the presence of ammonia by placing filter paper over the opening of the flask and determining a color reaction by placing a drop of Nesslers' reagent onto the filter paper. The results using this technique were not conclusive.

| Sample | Observations | | | |
|---|---|---|---|---|
| | 1 | 2 | 3 | 4 |
| A | None | None | None | None |
| B | None | None | None | None |
| C | None | None | Trace | Trace |

While the foregoing tests were subjective, they nevertheless indicate that those compositions, as in the present invention, which are non-acidic, over the longer term, are more effective in controlling odor.

With further reference to density in the pellets, generally speaking they should have a density sufficient to assure structural integrity on hydration, yet low enough that hydration or absorption readily occurs. When cellulosic or organic fibers are compressed to densities approaching solid wood (40 to 60 lbs/ft$^3$), the absorption capacity of the litter is greatly diminished. In order to maximize the absorption capacity of the litter described herein, it is found that the foregoing requirements were achieved by maintaining bulk density of the pelletized litter in about the 12 to 18 lbs/ft$^3$) range, with 15 lbs/ft$^3$ being preferred. The water absorption rate in litter that has a density of 15 lbs/ft$^3$ is typically 172% and at 20 lbs/ft$^3$ is 115%, by weight. A density as high as 25 lbs/ft$^3$, while not preferred, would be acceptable. The higher densities as mentioned hereinabove in prior art litters obviously suffer from low moisture absorption properties.

While the structural form of the litter has been described as being in pellets, other forms such as flat wafers, loose fibers and the like may also be used. In view of the odor-controlling properties, the compositions are considered useful for purpose of absorbing odors in various environments, such as inside a refrigerator.

While there have been described above the principles of this invention in connection with specific apparatus, it is to be clearly understood that this description is made only by way of example and not as a limitation to the scope of the invention.

What is claimed is:

1. A cellulosic product comprising a homogeneous mass of cellulosic fibers and calcined alkaline earth metal oxides, in which such fibers constitute the dominant content by weight of the litter, the pH of the mass being non-acidic, and the bulk density of the mass being in the range of about 12 to 25 lbs/ft$^3$ or less.

2. The product of claim 1 wherein the pH is about 8 to 9.

3. The product of claim 1 wherein the fibers are embodied in pellets, wafers or loose fibers, and said alkaline material includes calcium and magnesium oxide.

4. The product of claim 3 wherein said fibers form up to 99% by weight of the mass.

5. The product of claim 3 wherein said magnesium oxide forms about 0.5% to 1.26% by weight of the mass.

6. The product of claim 3 wherein said calcium oxide forms about 1% to 1.74% by weight of the mass.

7. The product of claim 3 wherein said fibers form about 9% to 97%, said calcium oxide forms about 1% to 1.74%, said magnesium oxide forms about 0.5% to 1.26%, and said mass includes water of about 12% to 14%, by weight.

8. The product of claim 7 wherein said pellets are about 3/16" diameter and ¼" to ½" in length, have a bulk density of about 12 to 18 lbs/ft$^3$, and the pH is basic.

9. A cellulosic product comprising an adherent mass of cellulosic fibers, n-hexadecyl pyridinium propionate, CaO or CaO.MgO, aluminum sulphate and water, and the pH is basic.

10. The cellulosic product of claim 9 wherein said fibers form about 95%, said N-hexadecyl pyridinium propionate forms about 0.1% to 1.0%, said CaO or CaO.MgO forms about 1% to 5%, and said aluminum sulphate forms about 1.0% to 3.0%, by weight, of the mass.

11. The process for the production of pellets of cellulosic composition comprising admixing cellulosic fibers and calcined alkaline earth metal oxides in a weight ratio of about 95% to 97% fibers, about 1% to 1.74% calcium oxide and about 0.5% to 1.26% magnesium oxide, moisturizing the resultant admixture, and pelletizing said moistened admixture, the cellulosic fibers being dominant in the admixture, admixing one of the N-alkyl pyridinium propionates prior to said moisturizing, and controlling the pH to a level greater than 7.

12. The process of producing a pelletized litter comprising the steps of forming a cellulosic fiberous mass, mixing with said mass <200 mesh calcium and magnesium oxides in a weight ratio of about 95% to 97% fibers, about 1% to 1.74% calcium oxide, about 0.5% to 1.26% magnesium oxide, moisturizing the mixture to a content by weight of about 30% to 40% water, and pelletizing the moisturized mixture to a bulk density of less than about 25 lbs/ft$^3$.

13. The process of claim 12 including drying the pellets to a level of about 12% to 14% moisture, said cellulosic fibers being formed of one or more of newsprint, magazines or mixed paper.

14. The process of the production of pellets of cellulosic composition comprising homogeneously admixing cellulosic fibers and calcined alkaline earth metal oxides, moisturizing the resultant admixture, and pelletizing said moisture admixture, the cellulosic fibers being dominant in the admixture, drying the pellets and controlling the bulk density to a level below about 25 pounds per cubic foot, and controlling the pH to a level greater than 7, said fibers forming from about 90% to 99% by weight of the mixture.

15. A cellulosic product comprising an adherent mass of cellulosic fibers, calcium oxide and water, in which such fibers constitute the dominant content by weight of the product, and the bulk density is about 18 lbs/ft$^3$ or less.

16. The cellulosic product of claim 15 wherein said fibers form up to 99% by weight of the mass.

17. The cellulosic product of claim 16 wherein said fibers are in a range of about 90% to 97% by weight of the mass.

* * * * *

UNITED STATES PATENT AND TRADEMARK OFFICE
CERTIFICATE OF CORRECTION

PATENT NO. : 4,458,629
DATED : July 10, 1984
INVENTOR(S) : Milton Gerber

It is certified that error appears in the above-identified patent and that said Letters Patent is hereby corrected as shown below:

Column 7, Line 6, change "upob" to --upon--.
Column 8, line 65, change "9% to --95%--.

Signed and Sealed this

Fifteenth Day of January 1985

[SEAL]

Attest:

GERALD J. MOSSINGHOFF

Attesting Officer

Commissioner of Patents and Trademarks